United States Patent [19]

Murdock

[11] Patent Number: 5,166,612

[45] Date of Patent: Nov. 24, 1992

[54] MICROMECHANICAL SENSOR EMPLOYING A SQUID TO DETECT MOVEMENT

[75] Inventor: Bruce Murdock, Beaverton, Oreg.

[73] Assignee: Tektronix, Inc., Wilsonville, Oreg.

[21] Appl. No.: 612,179

[22] Filed: Nov. 13, 1990

[51] Int. Cl.$^5$ .................. G01B 7/14; G01D 21/00; G01H 11/02; G01R 33/035

[52] U.S. Cl. .................. 324/207.13; 73/651; 324/207.22; 324/248; 324/262; 505/846

[58] Field of Search ............ 324/244, 248, 207.13, 324/207.15, 259, 257, 207.22, 207.16, 207.17, 234, 224, 260–262, 661; 505/701, 703, 702, 705, 843, 845, 846; 73/651, 517 R

[56] References Cited

U.S. PATENT DOCUMENTS

| | | | |
|---|---|---|---|
| 4,500,295 | 2/1985 | Insinger, III et al. | 324/207.13 X |
| 4,804,915 | 2/1989 | Hoenig | 324/259 X |
| 4,806,859 | 2/1989 | Hetrick | 324/257 X |
| 4,867,237 | 9/1989 | Hoenig | 324/248 |
| 4,912,408 | 3/1990 | Sawada et al. | 324/207.13 X |

OTHER PUBLICATIONS

J. B. Angell, Stephen C. Terry and Phillip W. Barth, "Silicon Micromechanical Devices", *Scientific American*, vol. 248, No. 4, pp. 1–13, Apr. (1983).

J. Clarke, "SQAUIDS, Brains and Gravity Waves", *Physics Today*, Mar. 1986, pp. 36–40.

Roger T. Howe and Richard S. Muller, "Silicon Micromechanics: sensors and actuators on a chip", *IEEE Spectrum*, Jul. 1990, pp. 29–31, 34 and 35.

Primary Examiner—Gerard R. Strecker
Assistant Examiner—Warren S. Edmonds
Attorney, Agent, or Firm—John D. Winkelman; John Smith-Hill

[57] ABSTRACT

A micromechanical sensor comprises a support, a micromechanical element that is movable relative to the support under the application of a stimulus, and a transducer. The transducer comprises a first component carried by the micromechanical element and movable therewith, and a second component stationary relative to the support. One of the first and second transducer components is a member for establishing a magnetic field and the other of the first and second transducer components is a SQUID positioned in the magnetic field for detecting variation in the magnetic field due to relative movement of the micromechanical element and the support.

3 Claims, 5 Drawing Sheets

MICROMECHANICAL SENSOR EMPLOYING A SQUID TO DETECT MOVEMENT

BACKGROUND OF THE INVENTION

This invention relates to a micromechanical sensor.

Micromechanics is the technology whereby mechanical devices such as beams, springs and diaphragms are fabricated using techniques that are employed in the fabrication of monolithic integrated circuits. The fabrication of silicon micromechanical devices is described in J. B. Angell, S. C. Terry and P. W. Barth, "Silicon Micromechanical Devices", Scientific American, vol. 248, No. 4, pages 44–55 (1983). Micromechanical devices are typically made from silicon, but other materials such as gallium arsenide, certain ceramics and quartz have also been used.

A method of processing a silicon die so that a diaphragm of silicon is formed will be described with reference to FIG. 1. FIG. 1A shows a monocrystalline <100> silicon die 2 having opposite main surfaces 4 and 6. A layer 8 of silicon dioxide is formed over both surfaces 4 and 6 and is then removed from the surface 4, leaving the surface 6 covered. Boron is diffused into the die through the surface 4, forming a thin layer 10 adjacent that surface. A rectangular hole 12 (FIG. 1B) is formed in the oxide layer 8 using known photoprocessing operations, the sides of the hole being parallel to the <110> directions of the die. The exposed portion of the surface 6 is exposed to an anisotropic etchant, which forms a pit 14 in the silicon, having sloping sides 16 parallel to the {111} planes and a flat bottom 18. The etching proceeds until it reaches the doped layer 10, which acts as an etch stop (FIG. 1C). The portion of the layer 10 at the bottom of the pit thus forms a diaphragm 20.

It is known to form a cantilever beam of silicon by surface micromachining. For example, a layer of silicon dioxide may be formed on the front surface of a silicon die, and a layer of polysilicon deposited over the layer of silicon dioxide. The layer of polysilicon is patterned to define a strip that extends perpendicular to an edge of a larger area, and a layer of photoresist is deposited over the front surface of the processed die. An aperture is defined in the layer of photoresist, the aperture being sized and positioned so that the strip of polysilicon is exposed. The front surface of the structure is then exposed to an etchant that removes silicon dioxide but does not remove silicon, either in the polycrystalline or the monocrystalline form, and accordingly the silicon dioxide beneath the strip of polysilicon is removed. The photoresist is stripped. The resulting structure is a cantilever beam extending over an aperture in the layer of silicon dioxide.

Another method of making a cantilever beam by bulk micromachining is described in J. B. Angell, S. T. Terry and P. W. Barth, cited above.

J. Clarke, "SQUIDs, Brains and Gravity Waves", Physics Today, March, 1986, page 36, describes the superconducting quantum interference device, or SQUID, and explains that the SQUID can be used as a very sensitive magnetic flux detector.

There are two types of SQUID that have been developed, namely the two junction or dc SQUID and the single junction or rf SQUID. A dc SQUID is shown schematically in FIG. 2 and comprises a loop 30 of conductive material connected to two terminals 32 and 34 spaced apart around the loop, and two Josephson junctions 36 on the two sides of the loop. When the SQUID is biased by a constant current between the terminals 32 and 34, the voltage between the terminals is periodic in the magnetic flux threading the loop 30. The period of the variation in voltage is equal to the flux quantum, which is about 2 E(−15) Wb. The change in voltage can be observed with conventional test and measurement instruments, and therefore the dc SQUID can be used to measure very small changes in magnetic flux. It is known to fabricate dc SQUIDs using thin-film technology.

SUMMARY OF THE INVENTION

In accordance with a first aspect of the present invention a micromechanical sensor comprises a support, a micromechanical element that is movable relative to the support under the application of a stimulus, a first transducer component carried by the micromechanical element and movable therewith, and a second transducer component stationary relative to the support. One of the first and second transducer components is a member for establishing a magnetic field and the other of the first and second transducer components is a SQUID positioned in the magnetic field for detecting variation in the magnetic field due to relative movement of the micromechanical element and the support.

In accordance with a second aspect of the present invention a micromechanical sensor apparatus comprises a support, a plurality of micromechanical cantilever beams that are independently movable relative to the support, a plurality of transducers associated with the cantilever beams respectively, each transducer comprising a first transducer component carried by the cantilever beam and movable therewith and a second transducer component stationary relative to the support, one of the first and second transducer components being a length segment of an electrical conductor and the other being a SQUID, means for applying an electrical current to each length segment of electrical conductor, whereby magnetic fields are established, and means for measuring the voltage developed between the terminals of each SQUID due to relative movement of the micromechanical cantilever beam and the support.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1A:
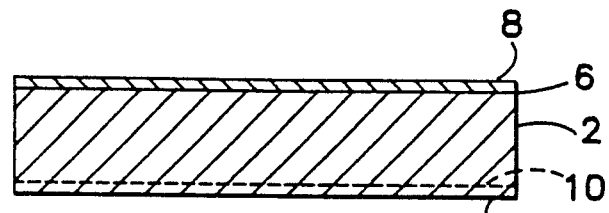
FIGS. 1A, 1B, and 1C illustrate fabrication of a micromechanical diaphragm.
Figure 1B:
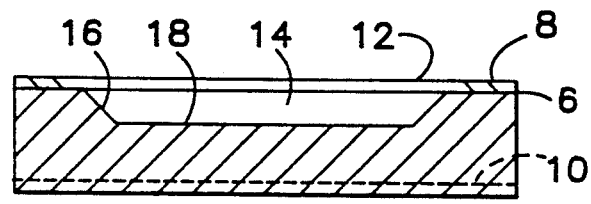
Figure 1C:
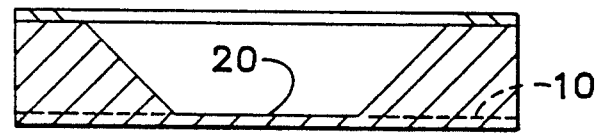
Figure 2:
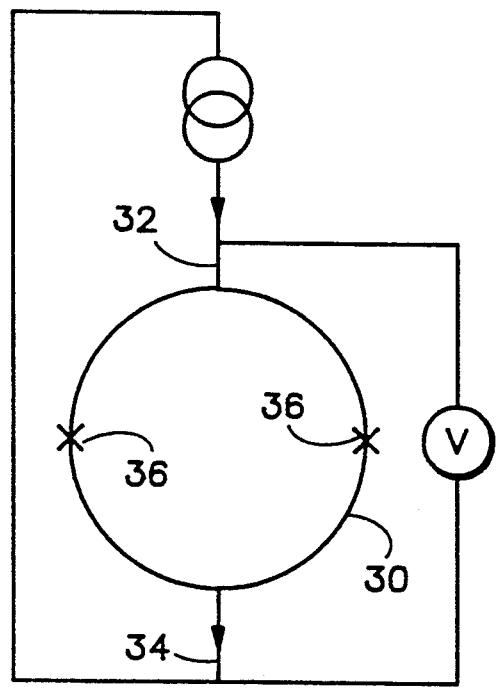
FIG. 2 is a schematic diaphragm of a dc SQUID.
Figure 3A:
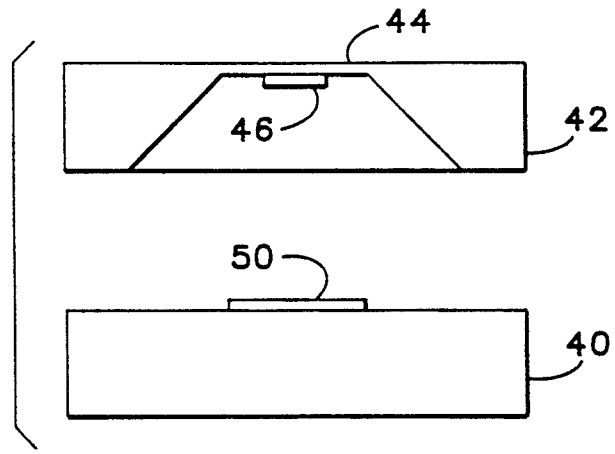
FIG. 3A illustrates schematically components of a micromechanical pressure sensor.

The sensor illustrated in FIG. 3 comprises two dies 40, 42 of monocrystalline silicon. The die 40 has planar upper and lower surfaces, but the die 42 has been micromachined, in the manner described with reference to FIG. 1, to form a diaphragm 44 at the upper surface of the die. A conductor 46 is deposited on the micromachined surface of the die 42 and traverses the underside of the diaphragm 44.

Figure 3B:
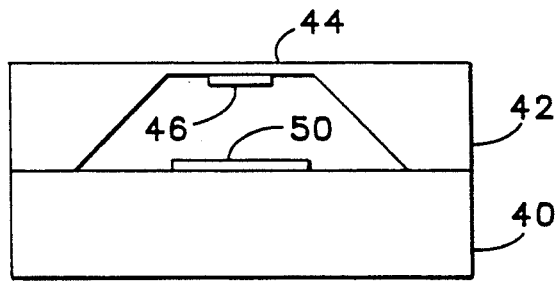
FIG. 3B illustrates a pressure sensor built from the components shown in FIG. 3A.

A dc SQUID 50 is formed on the upper surface of the die 40 using known thin-film technology. The two dies 40 and 42 are then bonded together as shown in FIG. 3B so that the SQUID is between the upper surface of the die 40 and the diaphragm 44. The SQUID is connected to a constant current source 52, and a voltage measurement instrument 54 is connected to the terminals of the SQUID. In order to cool the SQUID to a superconducting temperature, the back face of the die 40 is placed in good thermally conductive contact with a cryocooler (not shown).

An electric current is established in the conductor 46 by a current source 56, and this current establishes a magnetic field in the vicinity of the conductor. The magnetic flux of the field threads the loop of the SQUID 50.

If a physical excitation is applied to the sensor, such that the diaphragm is deflected, the distance between the conductor 46 and the SQUID 50 changes, and the flux that threads the loop of the SQUID also changes. By observing the change in voltage across the SQUID, a measure of the deflection of the diaphragm, and hence of the excitation applied to the sensor, can be derived.

Figure 4:
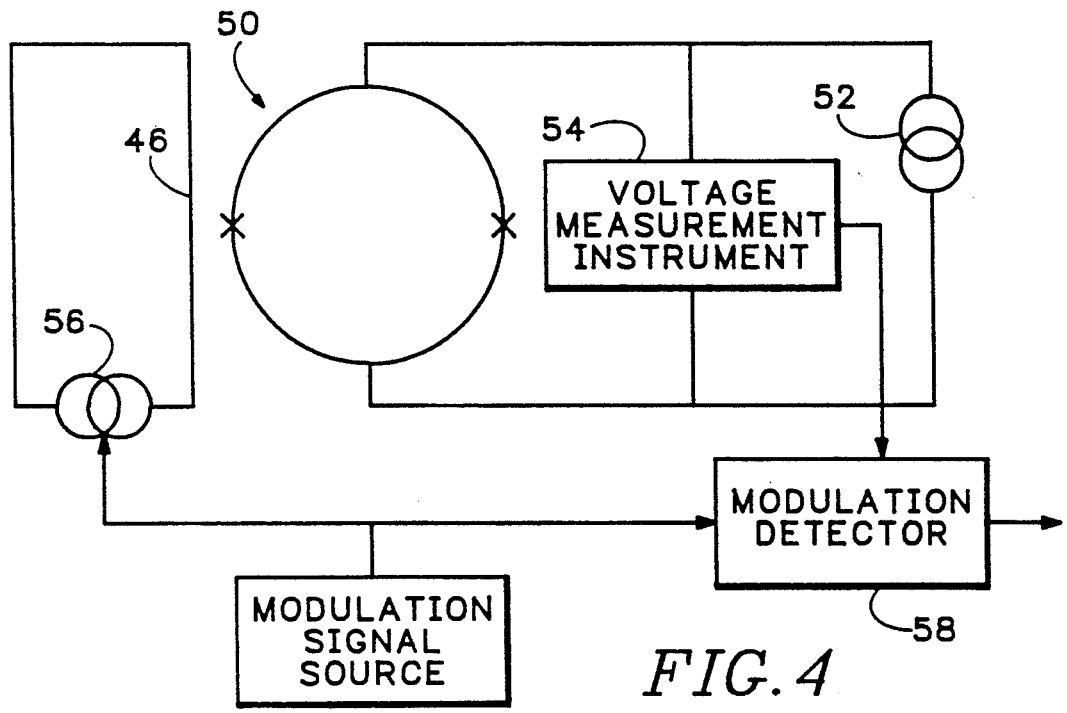
FIG. 4 is a schematic diagram of a measurement circuit including the FIG. 3B sensor.

In normal terrestrial environments, variations in the ambient magnetic field are much larger than the variations in the field due to movement of the diaphragm. The sensor may be shielded from the ambient field by placing it in a suitable container. Alternatively, if, as shown in FIG. 4, the current provided by the source 56 is not constant but is modulated in accordance with a predetermined function, the magnetic flux due to this current also is modulated and so is the change in voltage across the SQUID. A modulation detector 58 that receives the modulation signal used to control the current source 56 can extract useful signal information from the output signal of the instrument 54 with a high signal-to-noise ratio.

Figure 5:
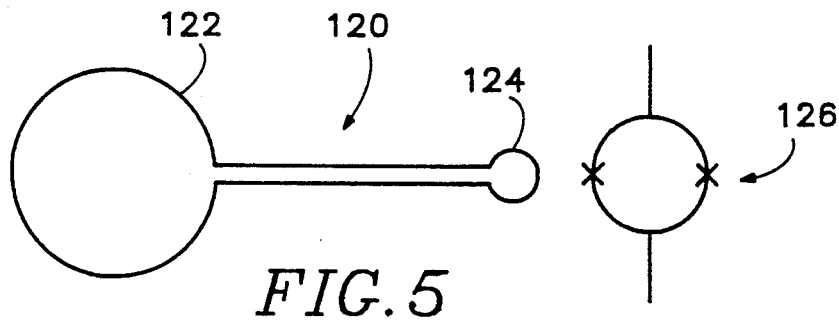
FIGS. 5 and 6 illustrate schematically two arrangements of SQUIDs and pick-up coils.

If the current carried by the conductor 46 is very small, it may be desirable to magnify a change in the flux threading the loop of a SQUID, so as to improve sensitivity of the sensor. FIG. 5 illustrates a modified sensor, comprising a SQUID 126 and a pick-up coil 120 of superconducting material. The coil 120 has two loops 122, 124 of area A' and A, A' being larger than A. The loop 122 is positioned so that it is linked by the flux to be measured and the loop 124 is in flux-linking relationship with the SQUID 126. When the flux to be measured changes, due to movement of the conductor 46 relative to the pick-up coil, a current is induced in the loop 122, and since loop 124 is connected in series with the loop 122 this current also flows through the loop 124, generating a flux change that is related to the change in flux linking loop 122 by a factor equal to A'/A. Accordingly, the change in flux linking the SQUID is magnified with respect to the change in flux linking loop 122 by a factor equal to the ratio of the areas of the two loops.

Figure 6:
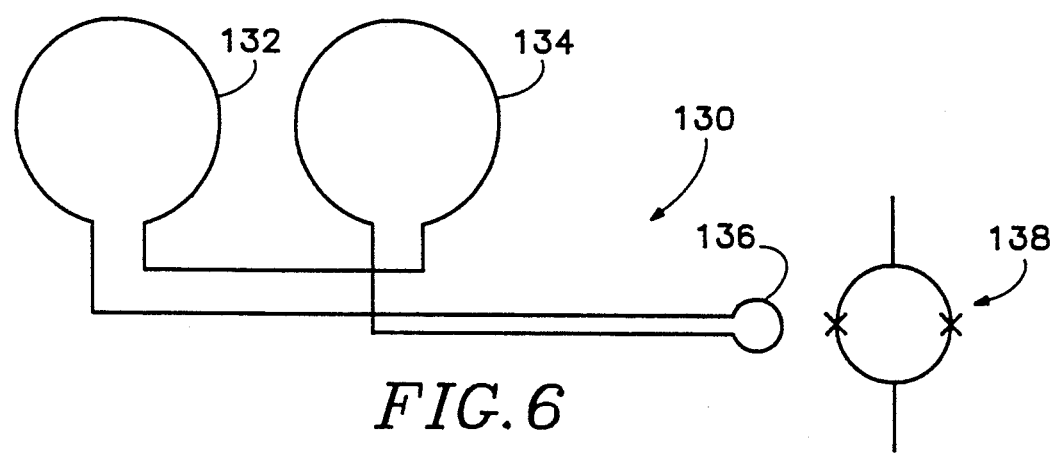

FIG. 6 illustrates a sensor in which the pick-up coil 130 has two loops 132, 134, of area A' and A" respectively, positioned to be linked by the flux to be measured, and a single loop 136, of area A, in flux-linking relationship with a SQUID 138. The two loops 132 and 134 are connected in opposition, so that the current generated in coil 130 in response to a change in flux is dependent on the difference between the flux linking loop 132 and that linking loop 134. The flux generated in loop 136 is then proportional to $$\Delta\Phi(A'+A'')/A$$

where $\Delta\Phi$ is the difference between the flux linking loop 132 and that linking loop 134.

A sensor similar to that shown in FIG. 3 may be used as an accelerometer or vibration detector. However, use of a diaphragm as the moving element of an accelerometer or vibration detector is subject to the disadvantage that a diaphragm has a smaller dynamic range for response to mechanical excitation than, for example, a cantilever beam. As noted previously, cantilever beams formed by conventional surface and bulk micromachining methods have limited application because the beam curls up when it is formed.

FIG. 7 is a sectional view of a monocrystalline <100> silicon die 70 having a front surface 72 and a back surface 74. A layer 76 of silicon nitride is deposited on the back surface 74 to a thickness in the range from about 200 nm to about 1000 nm by a chemical vapor deposition process. Boron is then implanted into the die by way of its front surface 72 with a dose of 5 E16 cm$^{-2}$ using a voltage of 180 kv, so that a layer 78 containing a high concentration of boron ions is formed in the die subjacent the front surface. The boron ions are driven into the die by heating the die to a temperature of about 1100° C. for about 1.5 hours, and accordingly layer 78 is converted to a deeper layer 78' (FIG. 7B) in which the concentration of boron ions is lower than in layer 78. Nevertheless, the concentration of boron ions in layer 78' is at least 1 E20 cm$^{-3}$. The boron drive takes place under an atmosphere of nitrogen. Layers 80, 82 of Cr and Au are then deposited sequentially on front surface 72 to thicknesses of about 10 nm and 100 nm respectively, by evaporation. A layer 84 of photoresist is deposited on top of layer 82 and is patterned to define an aperture 86 by removing an area that is substantially U-shaped, whereby layer 82 is partially exposed through aperture 86 FIGS. 7B, 7C). The Au that is exposed through the aperture 86 in layer 84 is then removed by etching, as is the Cr that is exposed by removal of the Au. Accordingly, layer 78' is exposed through apertures in photoresist resist layer 84 and in layers 80, 82. The photoresist that remains is then stripped, and the portion of layer 78' that is exposed through layers 80 and 82 is removed by plasma etching (FIGS. 7D, 7E). The plasma etching does not result in any significant undercutting of layers 80 and 82. Removal of layer 78' results in exposure of undoped silicon. The edges of the U-shaped area of silicon exposed through the apertures in the layers 78', 80, 82 are oriented along the <110> directions. The front surface of the structure shown in FIGS. 7D and 7E is then exposed to an anisotropic etchant, such as KOH at 80° C., which attacks silicon. The rate at which the silicon is removed is greater in the {100} plane than in the {111} planes, and consequently a trough having a flat bottom 84 and sloping sides 86 parallel to the {111} planes is formed beneath the aperture in layer 78'. The anisotropic etchant does not attack layer 78' due to the doping of that layer with boron.

Figure 7A:
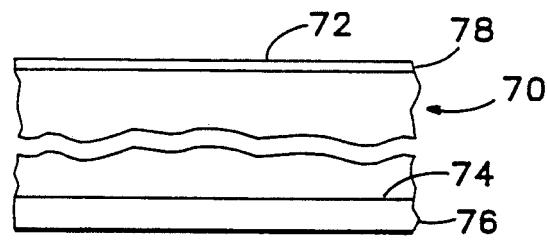
FIGS. 7A–7H illustrate various steps in fabrication of a cantilever beam by bulk micromachining of a silicon die, FIGS. 7A, 7B and 7D being sectional views of the die, FIG. 7C being a top plan view and FIGS. 7E–7H being perspective views.
Figure 7C:
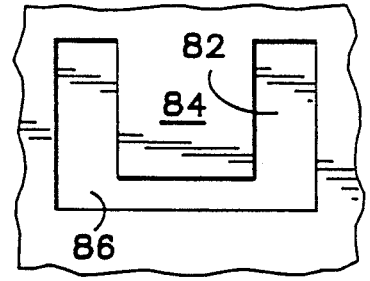
Figure 7B:
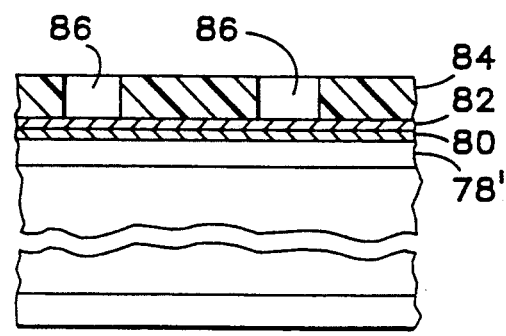
Figure 7D:
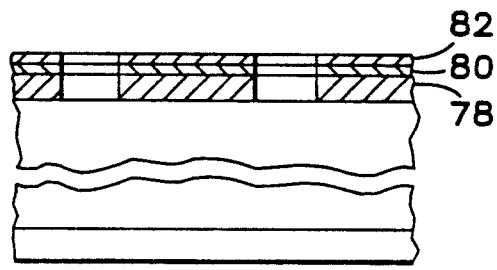
Figure 7E:
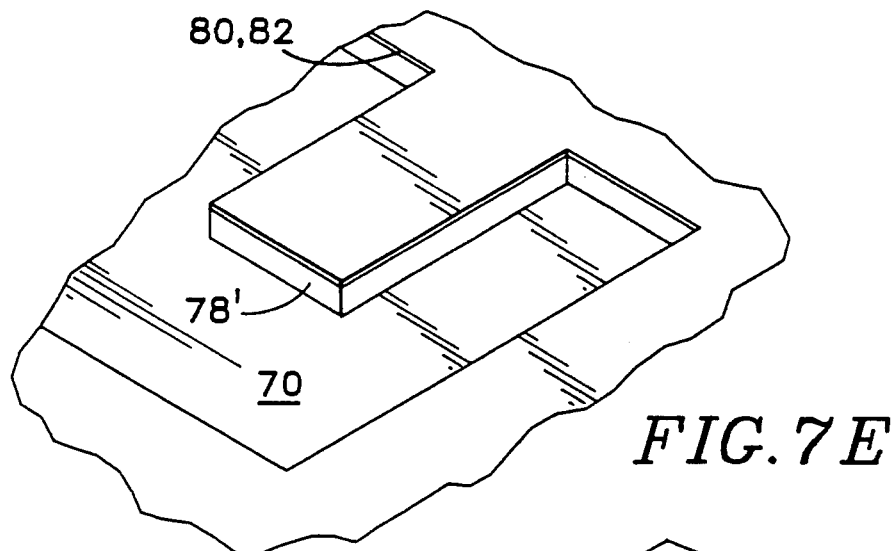
Figure 7F:
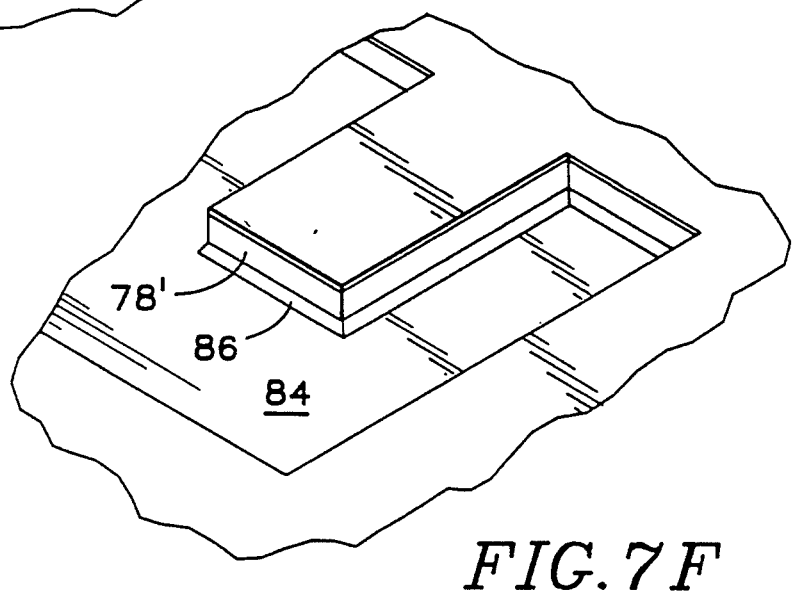
Figure 7G:
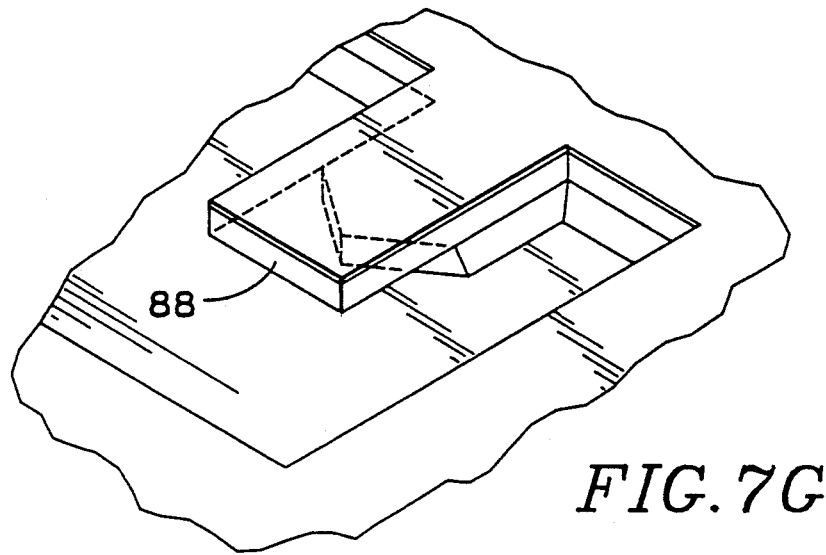
Figure 7H:
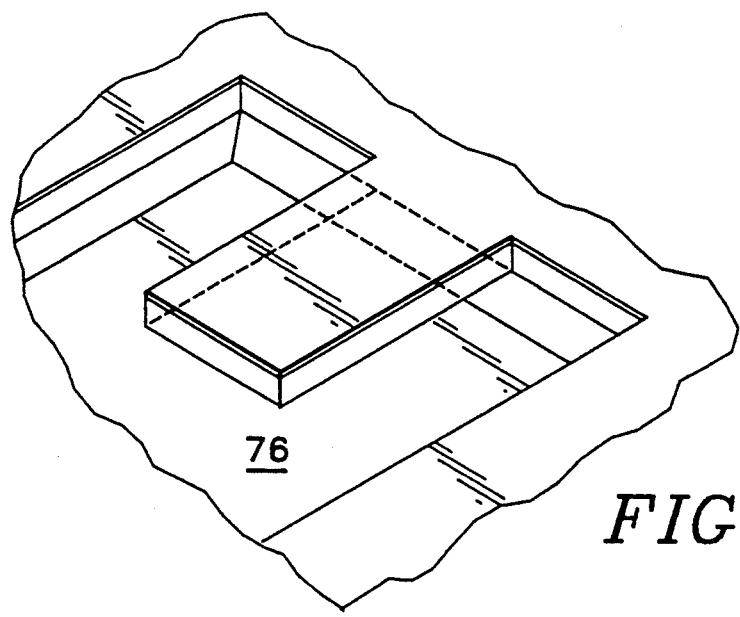

As the trough is formed, {221} planes are exposed at the convex corners of the trough. {221} planes are etched at a rate that is slower than the {100} planes and faster than the {111} planes. Accordingly, the portion 88 of layer 78' is progressively undercut (FIG. 7G). Ultimately, the {221} planes recede to the {111} planes, and eventually portion 88 is fully undercut (FIG. 7H). Accordingly, portion 88 forms a cantilever beam that projects over a well 90.

Etching of the {100} plane continues until the layer 76 of silicon nitride at the back surface of the die is exposed.

Figure 8:
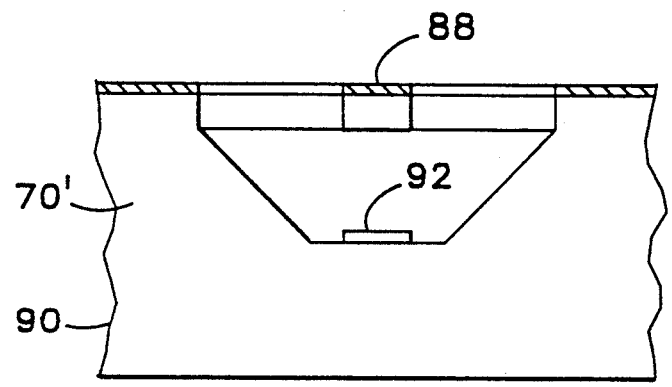
FIG. 8 is a sectional view of a vibration sensor.

It has been found that the layers of Cr and Au over beam 88 substantially prevent the beam from curling upwards as the silicon that lies under the beam is removed. Therefore, an accelerometer or vibration detector can be fabricated by forming a current-carrying conductor on the beam and forming a SQUID at a position that is stationary relative to the bulk material of the processed die 70'. For example, the layer 76 may be removed and the processed die 70' bonded to a second die 90 having a SQUID 92 formed on its upper surface, as shown in FIG. 8.

The coefficients of thermal expansion of the metallization and the boron-doped silicon are different, and therefore the deflection of the beam depends on temperature. Accordingly, the device shown in FIG. 7H can be used in fabricating a temperature sensor.

Figure 9:
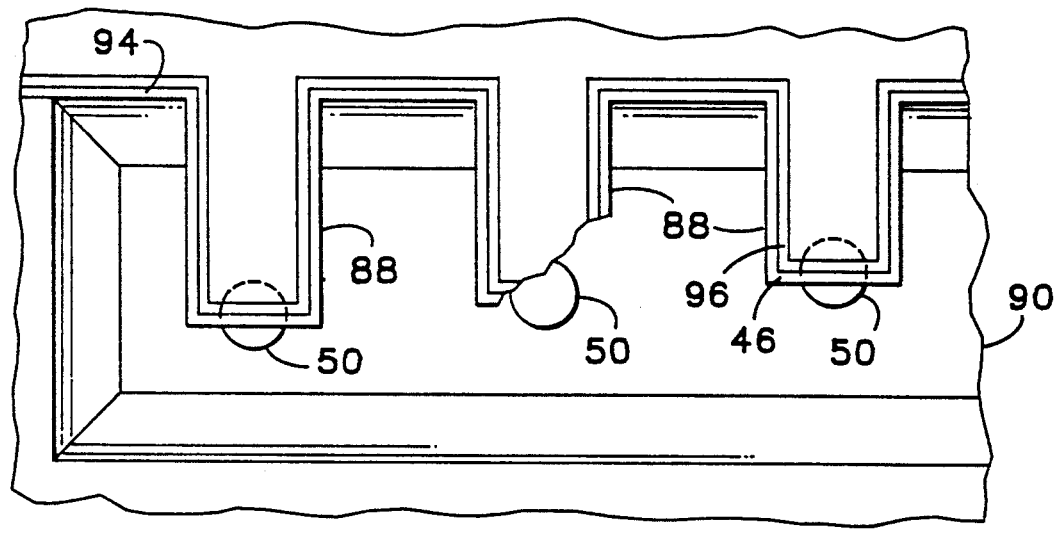
FIG. 9 is a partial top plan view of a vibration spectrum analysis sensor.

As shown schematically in FIG. 9, multiple beams of different lengths may be formed on a single die of silicon, and a current-carrying conductor 46 and a SQUID 50 may be associated with each beam. Since the beams are of different lengths, they have different resonant frequencies and this allows spectral analysis of vibrations. If the sensor is to be used to determine which vibration frequency components exceed a threshold amplitude, rather than measure the amplitudes of the vibration frequency components, it is preferable that the current-carrying conductors be segments of a single conductor traversing all beams. Since the beams 88 have layers of metal over their upper surfaces, a current-carrying conductor can be formed on the beams by partial removal of these layers so as to define a strip that is electrically separate from the remaining area of the layers. FIG. 9 shows a single current-carrying conductor 94 traversing all the beams/ formed by removing the metal layers 80 and 82 along a serpentine strip 96. Conductor 94 is connected at its opposite ends to current source 56, and the terminals of SQUIDs 50 are connected to the voltage measurement instrument 54. In order to achieve a high Q, the depth of the well beneath the beams must be sufficiently large that the air present in the well does not damp the vibration of the beams.

It will be appreciated that the present invention is not restricted to the particular embodiments that have been described and illustrated, and that variations may be made therein without departing from the scope of the invention as defined in the appended claims and equivalents thereof. For example, the invention is not limited to use of a single linear conductor to generate the magnetic field that interacts with the SQUID, since techniques for forming coils on an integrated circuit die are well developed. Also, if it is not necessary that the magnetic flux threading the loop of the SQUID be modulated, for example because the sensor is shielded or is used in an environment having a substantially constant ambient magnetic field, a permanent magnet may be used instead of the conductor 46 and the current source 56. Further, although the invention has been described with reference to a dc SQUID, an rf SQUID may be used instead. The invention is not restricted to use with SQUIDs designed to operate at liquid helium temperature (about 4K), and is applicable to SQUIDs that operate at higher temperatures, including liquid nitrogen temperature (about 77K).

I claim:

1. Micromechanical sensor apparatus comprising:
   a support,
   a plurality of micromechanical cantilever beams that are independently movable relative to the support and have different respective resonant frequencies of vibration,
   a plurality of transducers associated with the cantilever beams respectively, each transducer comprising a first transducer component carried by the cantilever beam and movable therewith and a second transducer component stationary relative to the support, one of the first and second transducer components being a length segment of an electrical conductor and the other being a SQUID,
   means for applying an electrical current to each length segment of electrical conductor, whereby magnetic fields are established, and
   means for measuring the voltage developed between the terminals of each SQUID due to relative movement of the micromechanical cantilever beam and the support.

2. Sensor apparatus according to claim 1, wherein the length segments are series-connected segments of a single electrical conductor.

3. Sensor apparatus according to claim 1, wherein the beams are of different respective lengths.

* * * * *